United States Patent
Kim et al.

(10) Patent No.: US 11,291,529 B2
(45) Date of Patent: Apr. 5, 2022

(54) ORTHODONTIC MEMBER AND METHOD FOR PRODUCING SAME

(71) Applicants: VERICOM CO., LTD., Chuncheon-si (KR); Tae Kyung Kim, Seongnam-si (KR)

(72) Inventors: Tae Kyung Kim, Seongnam-si (KR); Myung Hwan Oh, Seoul (KR); Yunki Kim, Anyang-si (KR)

(73) Assignees: VERICOM CO., LTD., Chuncheon-si (KR); Tae Kyung Kim, Seongnam-si (KR)

( * ) Notice: Subject to any disclaimer, the term of this patent is extended or adjusted under 35 U.S.C. 154(b) by 760 days.

(21) Appl. No.: 15/742,264

(22) PCT Filed: May 13, 2016

(86) PCT No.: PCT/KR2016/005056
§ 371 (c)(1),
(2) Date: Jan. 5, 2018

(87) PCT Pub. No.: WO2017/010669
PCT Pub. Date: Jan. 19, 2017

(65) Prior Publication Data
US 2018/0193112 A1    Jul. 12, 2018

(30) Foreign Application Priority Data

Jul. 16, 2015  (KR) .......................... 10-2015-0100930
Dec. 18, 2015  (KR) .......................... 10-2015-0181547

(51) Int. Cl.
*A61C 7/28*    (2006.01)
*A61C 7/20*    (2006.01)

(52) U.S. Cl.
CPC ............... *A61C 7/282* (2013.01); *A61C 7/20* (2013.01); *A61C 7/28* (2013.01); *A61C 2201/00* (2013.01); *A61C 2201/002* (2013.01)

(58) Field of Classification Search
CPC .. A61C 7/28; A61C 7/20; A61C 7/145; A61C 2201/002; A61C 7/12; A61C 7/14;
(Continued)

(56) References Cited

U.S. PATENT DOCUMENTS 4,952,141 A * 8/1990 Wool ...................... A61C 7/14
                                                          433/24
5,674,067 A   10/1997 Masel
(Continued)

FOREIGN PATENT DOCUMENTS

JP      2009072588 A    4/2009
KR   2020120007066 A   10/2012
(Continued)

OTHER PUBLICATIONS

International Search Report of PCT/KR2016/005056, dated Aug. 8, 2016, English Translation.
(Continued)

*Primary Examiner* — Yan Lan
(74) *Attorney, Agent, or Firm* — STIP Law Group, LLC

(57) ABSTRACT

Disclosed is an orthodontic member, having a tube shape, a hollow polygonal prism shape, a hollow truncated polygonal pyramid shape, a hollow truncated cone shape, or a funnel shape, and including a water-soluble or biodegradable material, wherein the orthodontic member into which a wire is inserted is attached to the teeth, thereby making it simple to perform orthodontic treatment.

17 Claims, 7 Drawing Sheets

(58) Field of Classification Search
CPC ....... A61C 7/22; A61C 7/282; A61C 2201/00; A61C 7/02; A61C 7/16; A61C 8/0012; A61C 8/0016
USPC ...................................................... 433/9, 20
See application file for complete search history.

(56) References Cited

U.S. PATENT DOCUMENTS

| | | | |
|---|---|---|---|
| 2005/0191592 A1* | 9/2005 | Farzin-Nia | A61C 7/00 433/22 |
| 2011/0053108 A1 | 3/2011 | Ariza | |
| 2012/0199138 A1 | 8/2012 | Hannapel et al. | |
| 2014/0212827 A1 | 7/2014 | Tzou et al. | |
| 2014/0302448 A1 | 10/2014 | Cassalia | |
| 2015/0111166 A1* | 4/2015 | Ariza | A61C 7/282 433/9 |

FOREIGN PATENT DOCUMENTS

| | | |
|---|---|---|
| KR | 101234205 B1 | 2/2013 |
| KR | 101547795 B1 | 8/2015 |
| KR | 101591011 B1 | 2/2016 |
| TW | 201507704 A | 3/2015 |

OTHER PUBLICATIONS

Office Action from Taiwan Intellectual Property Office of 10821167950, dated Dec. 9, 2019.
The extended European search report of EP 16 82 4586, dated Feb. 28, 2019.
Office Action from Japan Patent Office, dated Aug. 31, 2018.
Office action from China National Intellectual Property Administration of 201680041882.3, dated Nov. 26, 2019.

* cited by examiner

[FIG. 1]
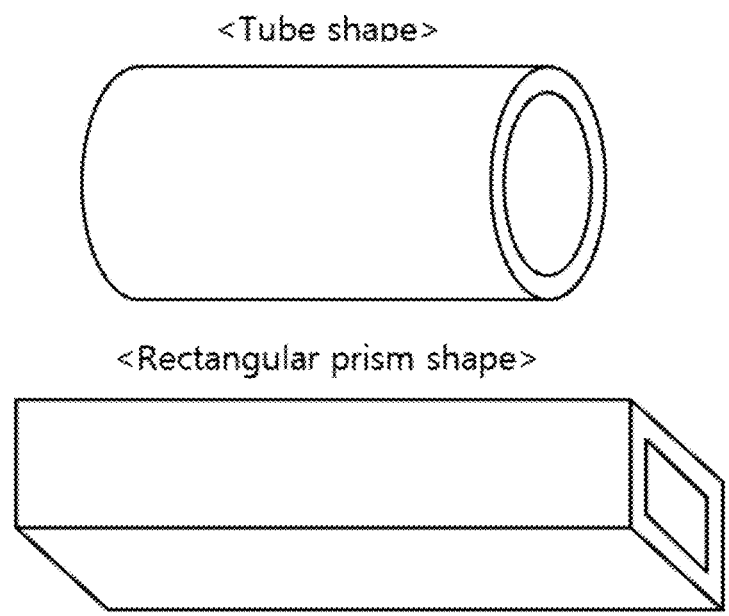
[FIG. 2]
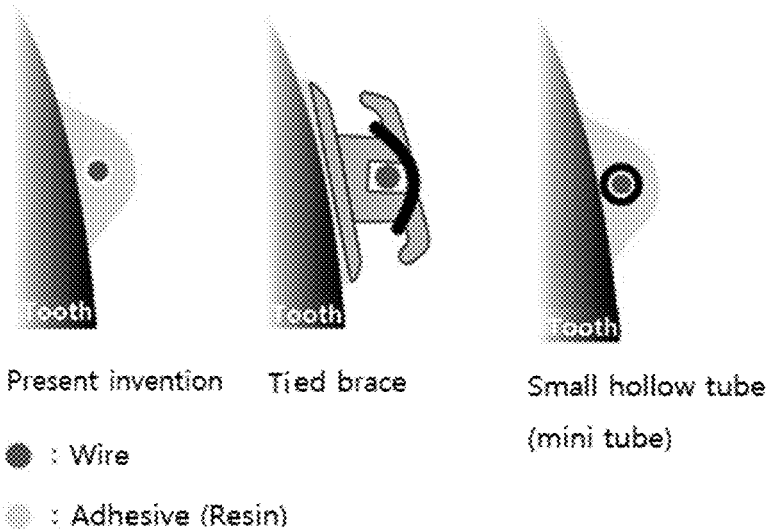

[FIG. 3]
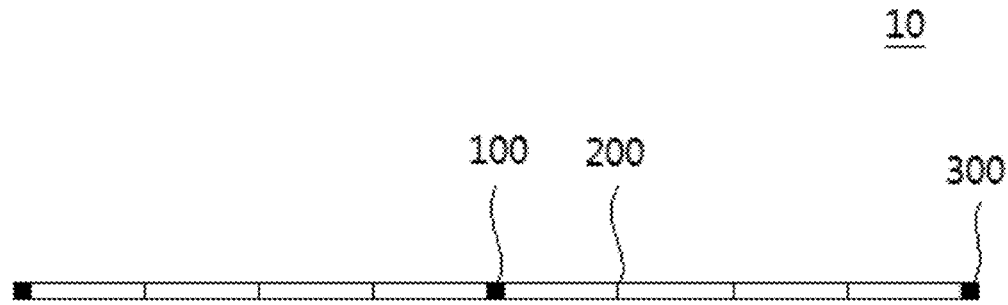
[FIG. 4]
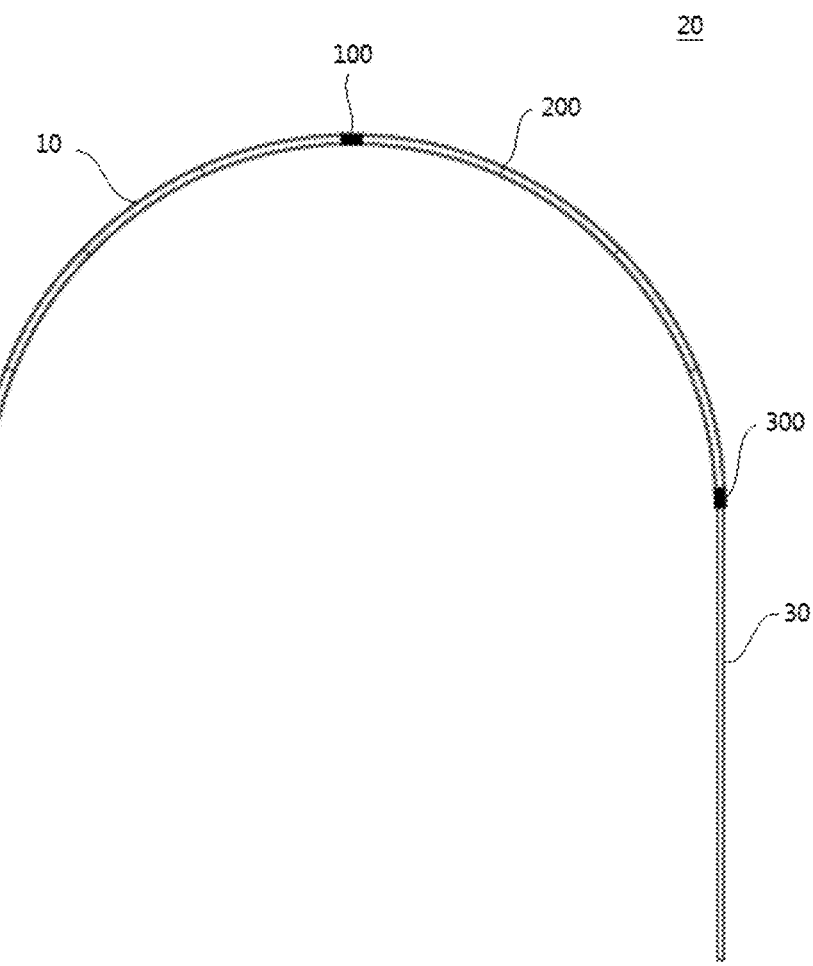

[FIG. 5]
[FIG. 6]
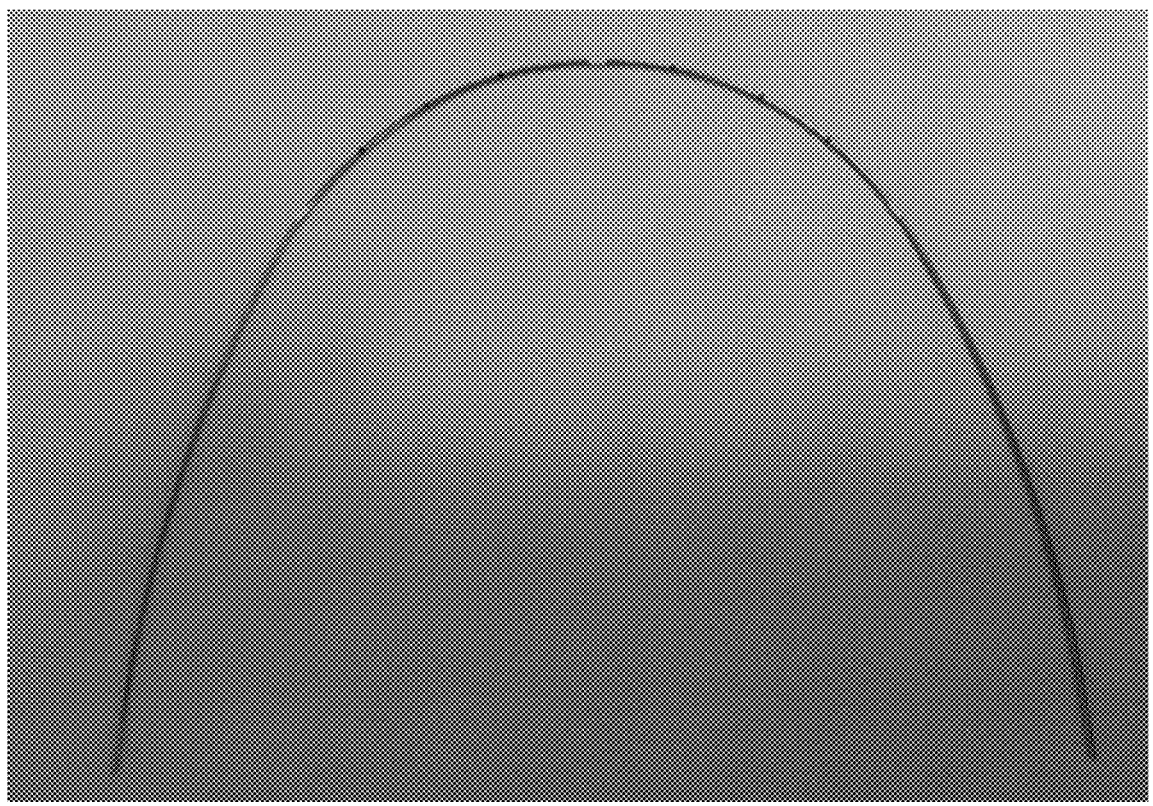

[FIG. 7]
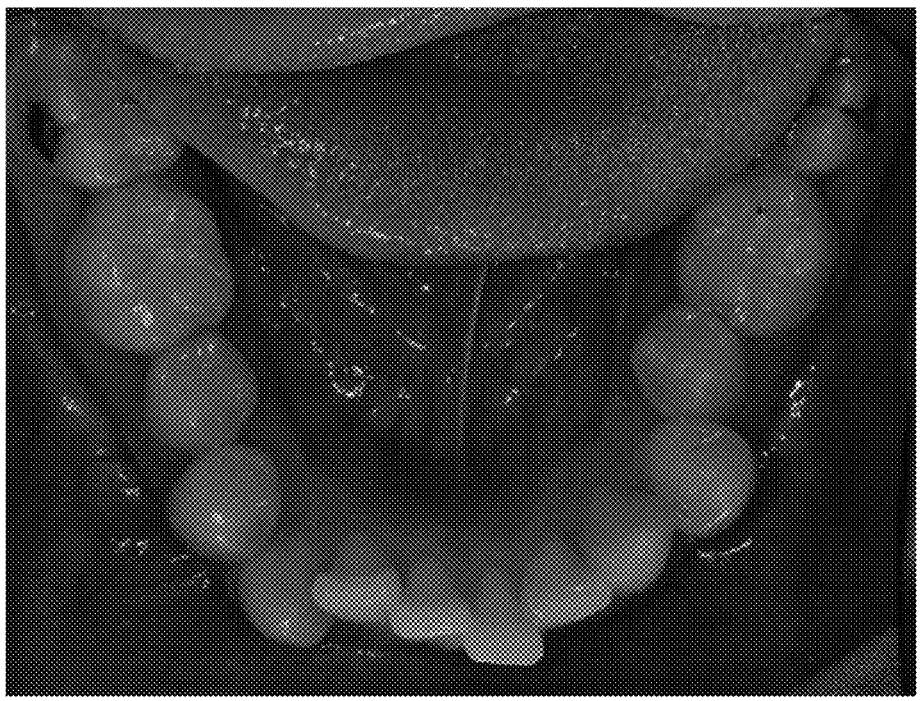
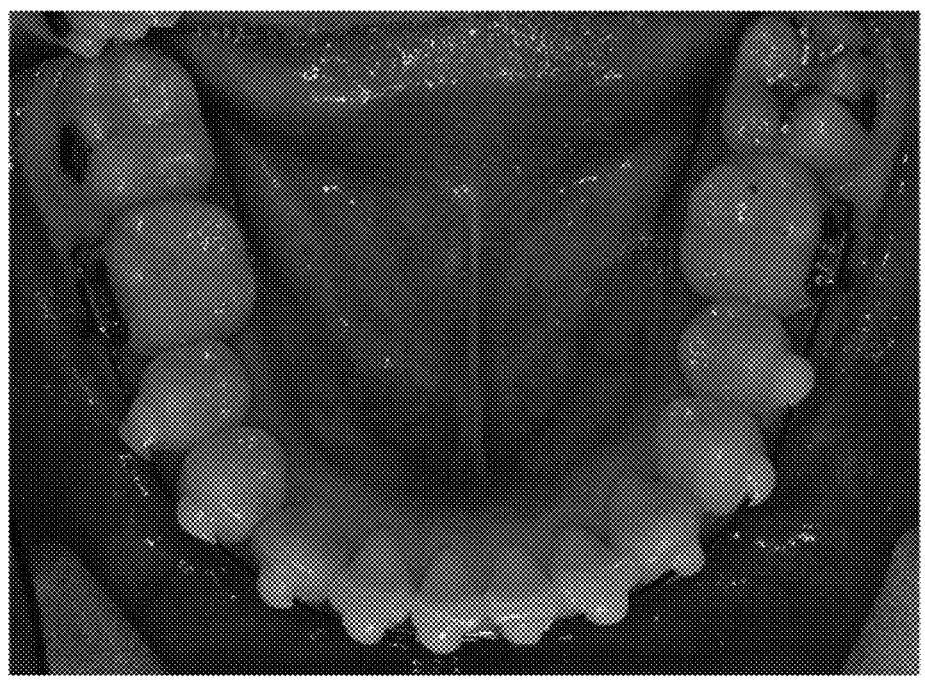

[FIG. 8]
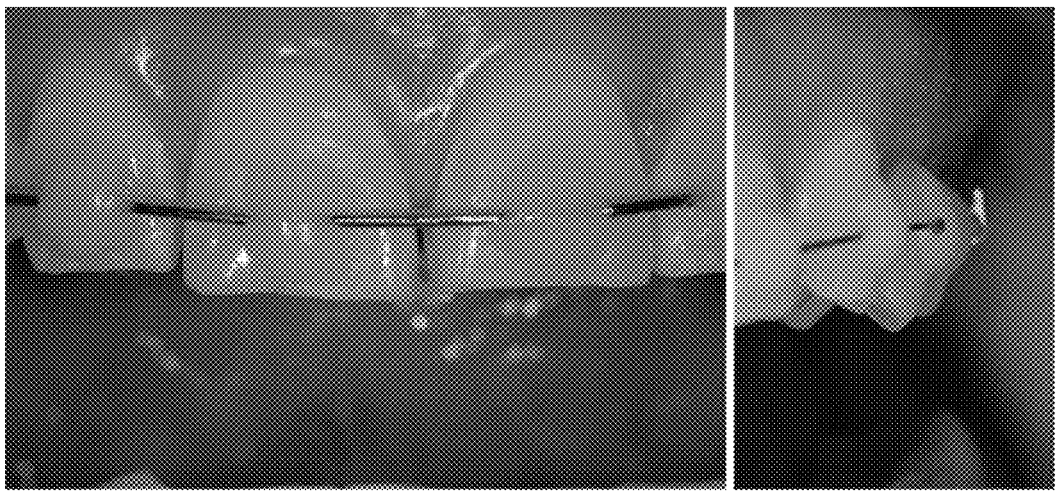
[FIG. 9]
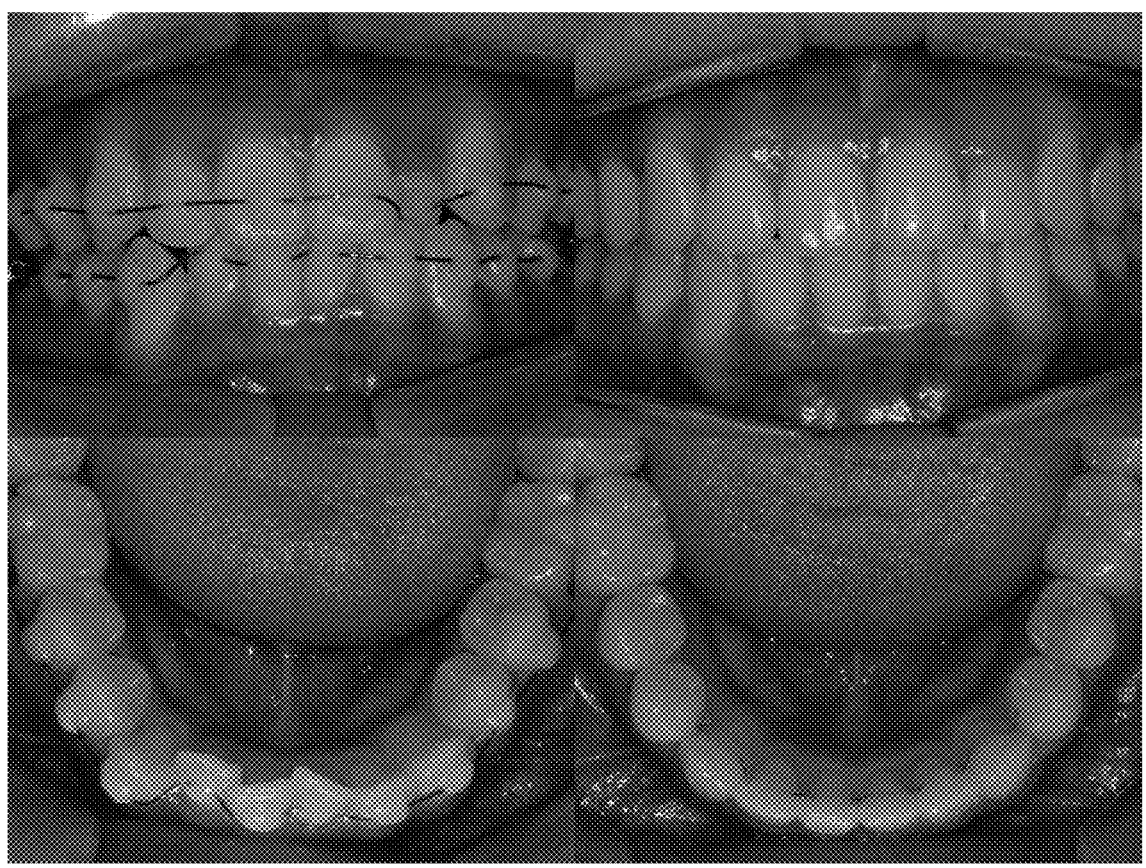

[FIG. 10]
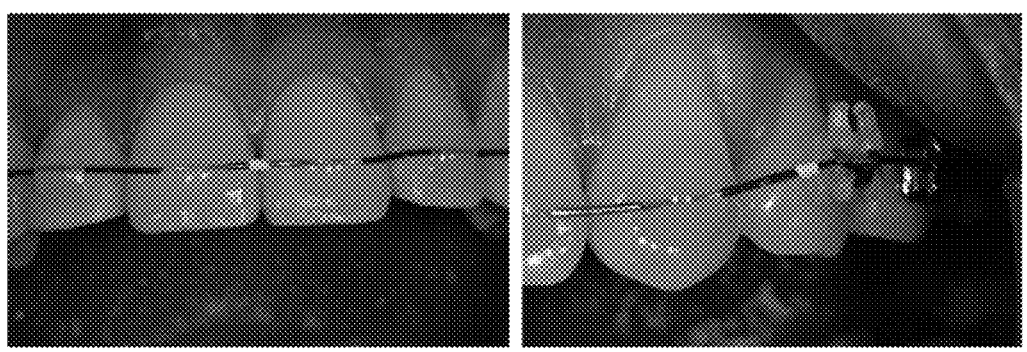
[FIG. 11]

[FIG. 12]
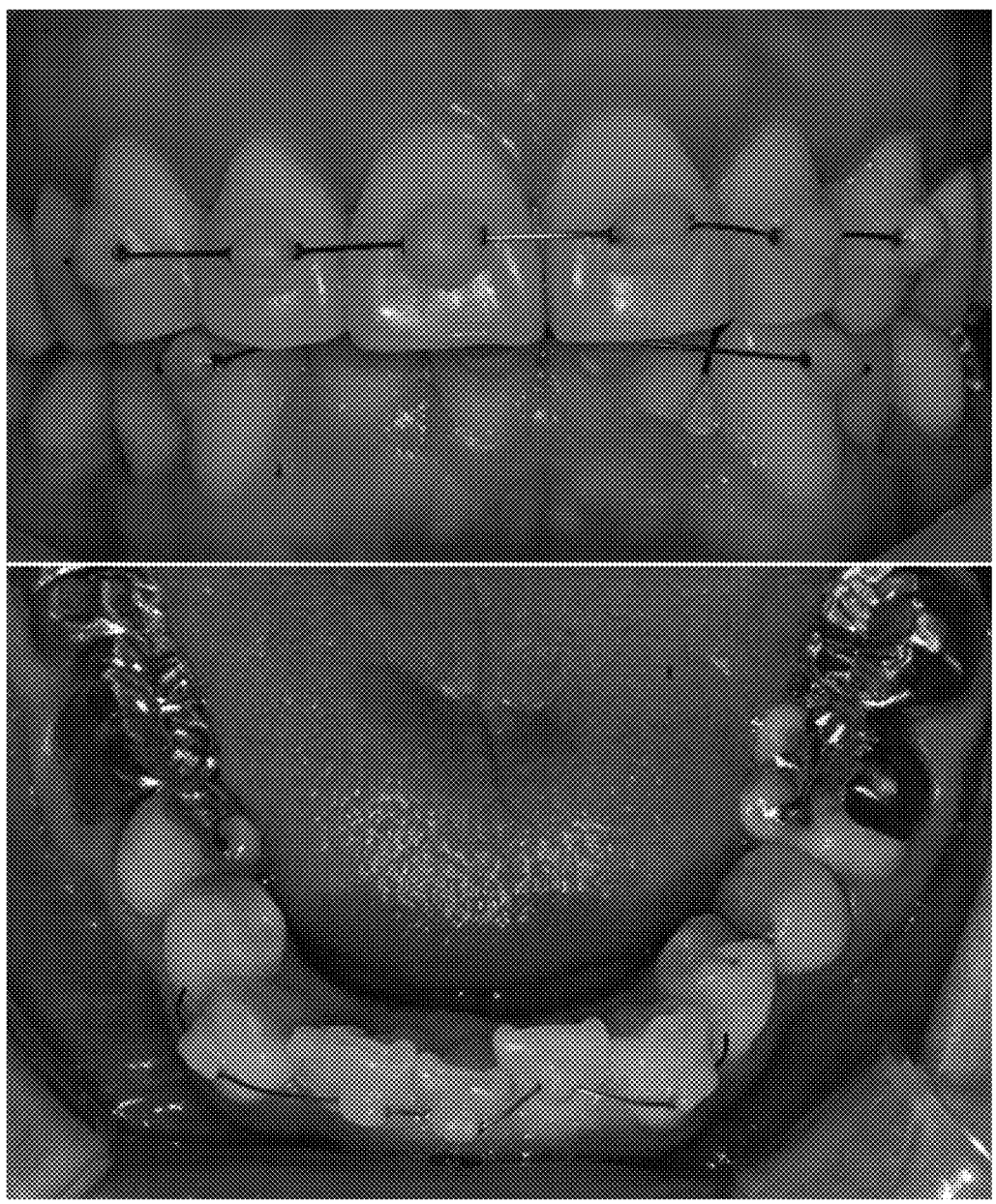

ORTHODONTIC MEMBER AND METHOD FOR PRODUCING SAME

CROSS-REFERENCE TO RELATED APPLICATIONS

This application is the U.S. National Phase under 35 U.S.C. § 371 of International Application No. PCT/KR2016/005056 filed on May 13, 2016, which in turn claims the benefit of Korean Application No. 10-2015-0100930, filed on Jul. 16, 2015 and Korean Application No. 10-2015-0181547, filed on Dec. 18, 2015, the disclosures of which are incorporated by reference into the present application.

TECHNICAL FIELD

The present invention relates to an orthodontic member and a method of manufacturing the same and, more particularly, to an orthodontic member and a method of manufacturing the same, wherein orthodontic treatment may be simply performed even without the use of dental braces.

BACKGROUND ART

Malocclusion is a misalignment or incorrect relationship between the teeth of the two dental arches when they approach each other as the jaws close, and the correct treatment thereof is referred to as "orthodontic treatment". Since malocclusion leads to a poor appearance and also makes it difficult to perform pronunciation and chewing functions, a variety of orthodontic devices for correcting misaligned teeth are being used.

The most typical orthodontic device is braces, which are used together with orthodontic wire to thus move the teeth. Generally, braces play a role in transferring restorative force, caused by the wire that is bent in accordance with the form of the crooked teeth, to the teeth, and guiding the teeth so as to move in a sliding manner along the wire.

However, braces have a relatively large and complicated structure and are thus very difficult to use, and also, the braces are exposed outside and thus visible to others during treatment, undesirably deteriorating an aesthetic appearance.

With the goal of solving such problems, an orthodontic method is performed using wires and mini tubes in a small hollow tube form, and is disclosed in Korean Patent No. 1,234,205, entitled 'Orthodontic tube'.

However, the orthodontic method using the mini tubes has the following problems.

First, it is very difficult to insert a wire into tubes having an inner diameter smaller than 0.5 mm attached to irregularly crooked teeth.

Second, it is impossible to insert a wire from the back of the throat, and thus, the mini tubes cannot be used for the molars (back teeth), and may be limitedly applied to the orthodontic treatment of only the incisors (front teeth).

Therefore, there is the need to develop orthodontic methods which are simple and universal while minimizing the discomfort felt by patients.

DISCLOSURE

Technical Problem

Accordingly, the present invention is intended to provide a water-soluble or biodegradable hollow orthodontic member.

In addition, the present invention is intended to provide an orthodontic member that facilitates the insertion of a wire and attachment to the surface of teeth using an adhesive and enables simple orthodontic treatment.

In addition, the present invention is intended to provide an orthodontic member, which may be dissolved or biodegraded after a predetermined period of time for the orthodontic treatment, thus forming a clearance between the wire and the adhesive, whereby the teeth may easily move in a sliding manner along the wire.

In addition, the present invention is intended to provide an orthodontic member having a hollow portion, wherein a center mark is formed on the orthodontic member, and thus when a wire having a center line marked thereon is assembled with the orthodontic member by being inserted into the hollow portion thereof, the center of the orthodontic member may be easily aligned with the center line of the wire.

In addition, the present invention is intended to provide a method of manufacturing the orthodontic member.

Technical Solution

An aspect of the present invention provides an orthodontic member, which has a tube shape, a hollow polygonal prism shape, a hollow truncated polygonal pyramid shape, a hollow truncated cone shape, or a funnel shape, and includes a water-soluble or biodegradable material.

Also, the orthodontic member having the tube shape may have an inner diameter of 0.2 to 1.0 mm and a thickness of 0.001 to 0.5 mm.

Also, the hollow polygonal prism shape may be an n-gonal prism shape, in which n is any one integer from 3 to 20.

Also, the orthodontic member having the hollow polygonal prism shape may have a cross-section of a hollow polygonal shape, a circle inscribed on the hollow polygonal shape may have a diameter of 0.2 to 1.0 mm, and the orthodontic member having the hollow polygonal prism shape may have a thickness of 0.001 to 0.5 mm.

Also, the hollow truncated polygonal pyramid shape may be an n-gonal hollow truncated pyramid shape, in which n is any one integer from 3 to 20.

Also, the orthodontic member having the hollow truncated polygonal pyramid shape may have a cross-section of a hollow polygonal shape, and a ratio (F/f, p) of a maximum diameter (F) to a minimum diameter (f) of a circle circumscribed on the hollow polygonal shape may be $1 < p \leq 10$.

Also, the ratio (E/e, q) of a diameter (E) of a maximum inner circumference to a diameter (e) of a minimum inner circumference in the orthodontic member having the hollow truncated cone shape may be $1 < q \leq 10$.

Also, the orthodontic member having the funnel shape may be provided in a form in which a hollow truncated cone is connected to one end of a hollow cylinder.

Also, in the orthodontic member having the funnel shape, the ratio (D/d, r) of a diameter (D) of a maximum inner circumference of the hollow truncated cone to a diameter (d) of an inner circumference of the hollow cylinder may be $1 < r \leq 10$.

Also, the orthodontic member may be transparent or may have any one color selected from the group consisting of white, red, blue, yellow, green, and mixtures thereof.

Also, the orthodontic member may have a mark formed thereon.

Also, the mark may include at least one selected from among a center mark representing a center in a longitudinal direction of the orthodontic member, a working mark representing a length from the center of the orthodontic member, and an end mark representing an end of the orthodontic member.

Also, the center mark may be represented by a predetermined color depending on the size of an inner diameter or an outer diameter of the orthodontic member.

Also, the center mark may have a thickness of 0.1 to 5 mm.

The working mark may be provided in at least one working length on one side or both sides of the center mark.

The end mark may be formed on one end or both ends of the orthodontic member in the longitudinal direction.

Also, the color may be any one selected from the group consisting of white, red, blue, yellow, green, and mixtures thereof, and a specific example thereof may include white, black, red, yellow-red, yellow, yellow-green, green, blue-green, blue, blue-purple, purple, or red-purple.

Also, the water-soluble or biodegradable material may include at least one selected from among gelatin, starch, a starch derivative, cellulose, a cellulose derivative, plant gum, agar, algine, an alginic acid salt, carrageenan, chitosan, a chitosan derivative, pectin, dextran, hyaluronic acid, polyacrylamide, polyvinylpyrrolidone, polyvinylalcohol, polyacrylic acid, polyethylene glycol, polypropylene glycol, polyethylene oxide, polypropylene oxide, biodegradable polyamide, biodegradable polyurethane, and biodegradable polyester.

Also, the water-soluble or biodegradable material may further include, based on 100 parts by weight of the at least one selected from among gelatin, starch, a starch derivative, cellulose, a cellulose derivative, plant gum, agar, algine, an alginic acid salt, carrageenan, chitosan, a chitosan derivative, pectin, dextran, hyaluronic acid, polyacrylamide, polyvinylpyrrolidone, polyvinylalcohol, polyacrylic acid, polyethylene glycol, polypropylene glycol, polyethylene oxide, polypropylene oxide, biodegradable polyamide, biodegradable polyurethane, and biodegradable polyester, 1 to 200 parts by weight of a compound represented by Chemical Formula 1 below:

[Chemical Formula 1]

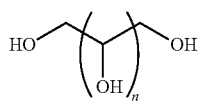

in Chemical Formula 1, n is any one integer from 1 to 8.

Also, the water-soluble or biodegradable material may include a compound represented by Chemical Formula 2 below:

[Chemical Formula 2]

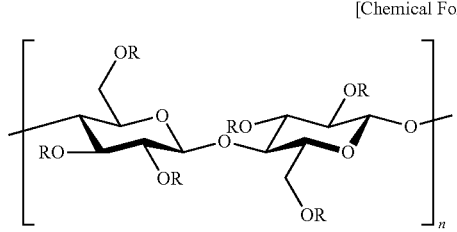

in Chemical Formula 2, R is independently a hydrogen atom, a deuterium atom, a C1 to C6 alkyl group or a C1 to C6 hydroxyalkyl group, n is a repeating unit, and the compound represented by Chemical Formula 2 has a number average molecular weight ranging from 1,000 to 9,000,000.

Another aspect of the present invention provides an orthodontic composite, comprising: an orthodontic member having a tube shape, a hollow polygonal prism shape, a hollow truncated polygonal pyramid shape, a hollow truncated cone shape, or a funnel shape; and an orthodontic wire that is inserted into the hollow portion of the orthodontic member, wherein the orthodontic member includes a water-soluble or biodegradable material.

Still another aspect of the present invention provides a method of manufacturing an orthodontic member, comprising: preparing a composition for an orthodontic member, comprising a solvent including water and a water-soluble or biodegradable material; coating a wire with the composition; drying the wire coated with the composition, thus preparing the wire coated with the water-soluble or biodegradable material; and removing the wire from the wire coated with the water-soluble or biodegradable material, thus obtaining the orthodontic member having a hollow portion.

Advantageous Effects

According to the present invention, a water-soluble or biodegradable orthodontic member can be provided.

Also, the present invention can provide an orthodontic member, which facilitates the insertion of a wire and the attachment to the surface of the teeth using an adhesive and enables simple orthodontic treatment.

Also, the present invention can provide an orthodontic member, which is dissolved or biodegraded after a predetermined period of time for the orthodontic treatment, thus forming a clearance between the wire and the adhesive, whereby the teeth can easily move in a sliding manner along the wire.

Also, the present invention can provide an orthodontic member having a hollow portion, wherein a center mark is formed on the orthodontic member, and thus when a wire having a center line marked thereon is assembled with the orthodontic member by being inserted into the hollow portion thereof, the center of the orthodontic member can be easily aligned with the center line of the wire.

Also, the present invention can provide a method of manufacturing such an orthodontic member.

DESCRIPTION OF DRAWINGS

FIG. 1 schematically illustrates a tube shape and a rectangular prism shape, among the shapes of an orthodontic member according to an embodiment of the present invention;

FIG. 2 schematically illustrates the side cross-sections of the teeth, to which a water-soluble or biodegradable tube-shaped orthodontic member according to an embodiment of the present invention, conventional braces, and conventional small hollow metal tubes are applied;

FIG. 3 schematically illustrates the orthodontic member according to an embodiment of the present invention, on which marks are formed;

FIG. 4 schematically illustrates the orthodontic member according to an embodiment of the present invention, with which a wire is assembled;

FIG. 5 is a photograph illustrating the orthodontic member according to an embodiment of the present invention, on which marks are formed;

FIG. 6 is a photograph illustrating the orthodontic member according to an embodiment of the present invention, wherein the orthodontic member having marks formed thereon is assembled with the wire;

FIG. 7 illustrates the critical test process for orthodontic treatment using the water-soluble tube-shaped orthodontic member of Example 3 according to the present invention;

FIG. 8 illustrates the front and side photographs of the clinical test results using the water-soluble tube-shaped orthodontic member of Example 3 according to the present invention;

FIG. 9 illustrates the clinical test process for orthodontic treatment using the water-soluble tube-shaped orthodontic member of Example 4 according to the present invention;

FIG. 10 illustrates the front and side photographs of the clinical test results using the water-soluble tube-shaped orthodontic member of Example 4 according to the present invention;

FIG. 11 illustrates the results of orthodontic treatment using conventional braces; and FIG. 12 illustrates photographs of orthodontic treatment using conventional hollow metal tubes.

BEST MODE

Hereinafter, embodiments and examples of the present invention are described in detail with reference to the appended drawings so as to be easily performed by a person having ordinary skill in the art.

The following description does not limit the present invention to specific embodiments, and furthermore, descriptions of known techniques, even if they are pertinent to the present invention, are considered unnecessary and may be omitted insofar as they would make the gist of the invention unclear.

The terms used herein are merely intended to explain specific examples and not to limit the present invention. Unless otherwise stated, the singular expression includes a plural expression. In this application, the terms "include" or "have" are used to designate the presence of features, numbers, steps, operations, elements, or combinations thereof described in the specification, and should be understood so as not to exclude presence or additional probability of one or more different features, numbers, steps, operations, elements, or combinations thereof.

FIG. 1 schematically illustrates an orthodontic member having a tube shape according to an embodiment of the present invention.

With reference to FIG. 1, the orthodontic member according to the present invention is described below.

According to the present invention, the orthodontic member has a tube shape, a hollow polygonal prism shape, a hollow truncated polygonal pyramid shape, a hollow truncated cone shape, or a funnel shape, and includes a water-soluble or biodegradable material.

The orthodontic member having a tube shape preferably has an inner diameter of 0.2 to 1.0 mm and a thickness of 0.001 to 0.5 mm.

The orthodontic member having a hollow polygonal prism shape has a cross-section of a hollow polygonal shape, and the diameter of a circle inscribed on the hollow polygonal shape is 0.2 to 1.0 mm. The thickness of the orthodontic member having a hollow polygonal prism shape preferably falls in the range of 0.001 to 0.5 mm. However, the inner diameter and the diameter thereof may vary depending on the diameter of the wire which is to be inserted into the hollow portion of the orthodontic member.

The hollow polygonal prism shape is an n-gonal prism shape, wherein n is any one integer from 3 to 20, preferably from 4 to 15, and more preferably 4 to 8, and still more preferably is a hollow rectangular prism shape in which n is 4.

As for the orthodontic member having a hollow truncated cone shape, the ratio (E/e, q) of the diameter (E) of the maximum inner circumference to the diameter (e) of the minimum inner circumference is $1<q\leq10$, preferably $2\leq q\leq5$, and more preferably $3\leq q\leq4$.

The orthodontic member having a hollow truncated polygonal pyramid shape has a cross-section of a hollow polygonal shape, and the ratio (F/f, p) of the maximum diameter (F) to the minimum diameter (f) of a circle circumscribed on the hollow polygonal shape is $1\leq p\leq10$, preferably $2\leq p\leq5$, and more preferably $3\leq p\leq4$.

The hollow truncated polygonal pyramid shape is an n-gonal truncated pyramid shape, wherein n is any one integer from 3 to 20, preferably from 4 to 15, and more preferably from 4 to 8.

The orthodontic member having a funnel shape is provided in a form in which a hollow truncated cone is connected to one end of a hollow cylinder, and the ratio (D/d, r) of the diameter (D) of the maximum inner circumference of the hollow truncated cone to the diameter (d) of the inner circumference of the hollow cylinder may be $1<r\leq10$. This ratio is preferably $2\leq r\leq5$, and more preferably $3\leq r\leq4$. Also, the orthodontic member having a funnel shape may be provided in a form in which a hollow truncated polygonal pyramid is connected to one end of a hollow polygonal prism, and the ratio (C/c, s) of the maximum diameter (C) to the minimum diameter (c) of a circle circumscribed on the hollow polygonal cross-sectional shape of the hollow truncated polygonal pyramid is $1<s\leq10$, preferably $2\leq s\leq5$, and more preferably $3\leq s\leq4$.

With reference to FIGS. 4 and 6, an orthodontic composite 20 composed of the orthodontic member 10 and an orthodontic wire 30 inserted therein is manufactured by inserting the orthodontic wire 30 into the hollow portion of the orthodontic member 10, and the wire covered with the member is attached to crooked teeth using a resin. A restorative force is generated in the wire that is bent along the form of the crooked teeth, and is transferred to the teeth in the form of an orthodontic force capable of moving the teeth by means of the resin adhesive. Simultaneously, the orthodontic member, which is water-soluble or biodegradable, is dissolved in the mouth, and thus, a clearance is formed between the wire and the resin, whereby the teeth may move in a sliding manner along the wire.

For the sake of working process, the orthodontic member may be transparent or may have any color selected from among white, red, blue, yellow, green, and mixtures thereof. Specifically, the color thereof may be transparent, or may include white, black, red, yellow-red, yellow, yellow-green, green, blue-green, blue, blue-purple, purple, or red-purple.

With reference to FIGS. 3 and 5, marks 100, 200, 300 may be formed on the orthodontic member 10 so as to facilitate the working process.

The center mark 100 representing the center in a longitudinal direction of the orthodontic member 10, the working mark 200 representing a distance from the center of the orthodontic member, or the end mark 300 representing the end of the orthodontic member may be provided.

The center mark may be represented by a predetermined color depending on the size of the inner diameter or the outer diameter of the orthodontic member.

The center mark may have a thickness of 0.1 to 5 mm.

The working mark may be provided in at least one working length on one side or both sides of the center mark.

The end mark may be formed on one end or both ends of the orthodontic member in the longitudinal direction.

The color of the mark may be any one selected from the group consisting of white, red, blue, yellow, green, and mixtures thereof, and a specific example thereof may include white, black, red, yellow-red, yellow, yellow-green, green, blue-green, blue, blue-purple, purple, or red-purple. When the orthodontic member having marks formed thereon is used, the center of the orthodontic member may be easily aligned with the center of the wire using the center mark, and the working length may be easily determined from the center of the orthodontic member using the working mark, and the end of the orthodontic member may be easily checked using the end mark.

Below is a description of a composition for an orthodontic member, suitable for use in preparing the water-soluble or biodegradable material according to the present invention.

According to the present invention, the composition for an orthodontic member may include a water-soluble or biodegradable material and a solvent including water. The coating composition for an orthodontic member may be used to coat an orthodontic wire or to manufacture an orthodontic member having a hollow portion.

Preferably, the composition for an orthodontic member may include 10 to 100 parts by weight of the water-soluble or biodegradable material and 20 to 990 parts by weight of the solvent including water.

As the water-soluble or biodegradable material, any material may be used so long as it is dissolved or decomposed in the mouth. Preferably, the water-soluble or biodegradable material may include at least one selected from among gelatin, starch, a starch derivative, cellulose, a cellulose derivative, plant gum, agar, algine, an alginic acid salt, carrageenan, chitosan, a chitosan derivative, pectin, dextran, hyaluronic acid, polyacrylamide, polyvinylpyrrolidone, polyvinylalcohol, polyacrylic acid, polyethylene glycol, polypropylene glycol, polyethylene oxide, polypropylene oxide, biodegradable polyamide, biodegradable polyurethane, and biodegradable polyester.

The biodegradable polyamide may be polylactic acid or modified polylactic acid.

The water-soluble or biodegradable material may further include, based on 100 parts by weight of the at least one selected from among gelatin, starch, a starch derivative, cellulose, a cellulose derivative, plant gum, agar, algine, an alginic acid salt, carrageenan, chitosan, a chitosan derivative, pectin, dextran, hyaluronic acid, polyacrylamide, polyvinylpyrrolidone, polyvinylalcohol, polyacrylic acid, polyethylene glycol, polypropylene glycol, polyethylene oxide, polypropylene oxide, biodegradable polyamide, biodegradable polyurethane, and biodegradable polyester, 1 to 200 parts by weight of a compound represented by Chemical Formula 1 below.

[Chemical Formula 1]

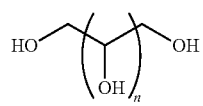

In Chemical Formula 1, n is any one integer from 1 to 8.

The compound represented by Chemical Formula 1 preferably includes sorbitol and glycerin.

More preferably, the water-soluble or biodegradable material includes, based on 100 parts by weight of gelatin, 5 to 100 parts by weight of glycerin and 1 to 100 parts by weight of sorbitol.

The water-soluble or biodegradable material may further include 1 to 250 parts by weight of purified water.

The gelatin has a jelly strength of 30 to 500 bloom, and preferably 100 to 400 bloom.

Jelly strength is a typical physical property of gelatin. The bloom value is used to show the strength of gelatin, and jelly strength may be defined as the force that is required to press a 6.67% gelatin solution to a depth of 4 mm from the surface thereof using the plunger of a jelly strength meter in accordance with British Standard (BS) 757.

Also, the water-soluble or biodegradable material may include a cellulose derivative that is a compound represented by Chemical Formula 2 below.

[Chemical Formula 2]

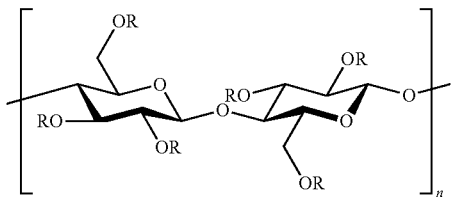

In Chemical Formula 2, R is independently a hydrogen atom, a deuterium atom, a C1 to C6 alkyl group or a C1 to C6 hydroxyalkyl group, n is a repeating unit, and the compound represented by Chemical Formula 2 has a number average molecular weight ranging from 1,000 to 9,000,000.

The polyethylene glycol is preferably a solid having a weight average molecular weight ranging from 1,000 to 100,000.

The water-soluble or biodegradable polymer may include modified starch and plant gum.

The compound represented by Chemical Formula 2 may be hydroxypropyl methyl cellulose (HPMC).

As for the hydroxypropyl methyl cellulose, the degree of substitution of a methoxy group may be 15 to 30%, and the degree of substitution of hydroxypropoxy may be 4 to 32%.

The hydroxypropyl methyl cellulose may have a viscosity of 1 to 35 mPa·s at a temperature of 20° C. in a 2 wt % aqueous solution.

The solvent may further include a linear or branched C2 to C9 alcohol. The weight ratio of water to alcohol in the solvent may range from 100:0 to 5:95.

The composition for an orthodontic member may further include at least one stabilizer selected from among a sorbic acid salt, a salicylic acid salt, and a benzoic acid salt.

The amount of the stabilizer may be 0.01 to 5 parts by weight based on 100 parts by weight of the water-soluble or biodegradable material. If the amount of the stabilizer is less than 0.01, no conservation effect may be exhibited. On the other hand, if the amount thereof exceeds 5 parts by weight, the mechanical properties of the resulting orthodontic member may deteriorate.

The composition for an orthodontic member may further include a colorant.

The colorant may include a natural edible colorant, a tar-based edible colorant, beta-carotene, copper sulfate, ferric oxide, caramel, copper, sodium iron chlorophyllin, or titanium oxide.

The coating composition for an orthodontic member may further include 0.1 to 5 parts by weight of a surfactant.

The surfactant may include polyethylene glycol, polysorbate, fatty acid monoglycerin ester, fatty acid polyglycol ester, fatty acid sorbitan ester, fatty acid sucrose ester, fatty acid alkanolamide, or a polyethyleneglycol condensed nonionic surfactant.

The polyethylene glycol may be a solid having a molecular weight ranging from 1,000 to 100,000.

In addition, the present invention may provide an orthodontic composite, comprising an orthodontic member having a tube shape, a hollow polygonal prism shape, a hollow truncated polygonal pyramid shape, a hollow truncated cone shape, or a funnel shape, and an orthodontic wire that is inserted into the hollow portion of the orthodontic member, and the orthodontic member may include a water-soluble or biodegradable material.

Below is a description of a method of manufacturing the orthodontic member according to the present invention.

First, a water-soluble or biodegradable material and purified water are mixed, thus preparing a composition for an orthodontic member (step a).

The composition for an orthodontic member may further include a compound represented by Chemical Formula 1 below.

[Chemical Formula 1]

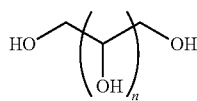

In Chemical Formula 1, n is any one integer from 1 to 8.

Step (a) is the preparation of the composition by mixing gelatin, glycerin, a sorbitol solution and purified water. The solvent of the sorbitol solution may be water.

The water-soluble or biodegradable material may be a compound represented by Chemical Formula 2 below.

[Chemical Formula 2]

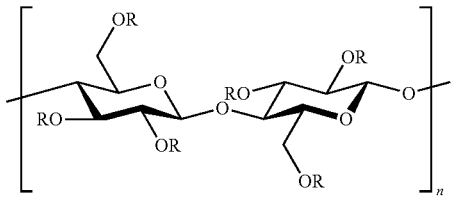

In Chemical Formula 2, R is independently a hydrogen atom, a deuterium atom, a C1 to C6 alkyl group or a C1 to C6 hydroxyalkyl group, n is a repeating unit, and the compound represented by Chemical Formula 2 has a number average molecular weight ranging from 1,000 to 9,000,000.

The C1 to C6 alkyl group is preferably —$CH_3$, and the C1 to C6 hydroxyalkyl group is preferably —$CH_2$—CHOH—$CH_3$.

The method may further include, after step (a), step (a-1) for maintaining the composition at 50 to 100° C. Step (a-1) is performed preferably at 55 to 95° C., and more preferably 60 to 90° C.

In the above temperature range, the components for the composition may be uniformly mixed.

Although step (a-1) is preferably performed for 2 to 6 hr, the processing time may vary depending on the temperature at step (a-1). Also, step (a-1) may further include a defoaming process, performed in a vacuum.

Step (a-2) for maintaining the composition at 50 to 65° C. may be further performed after step (a-1). Step (a-2) is conducted preferably at 53 to 62° C., and more preferably at 54 to 60° C.

Next, a wire is prepared, and the surface of the wire is coated with the composition, thus giving the wire coated with the composition (step b).

The coating process in step (b) may vary depending on the gelling temperature of the composition. In the case of a material having a low gelling temperature, the composition may be uniformly applied on the wire at a temperature equal to or higher than the gelling temperature. In the case of a material having a high gelling temperature, the composition may be uniformly applied on the wire at a temperature equal to or lower than the gelling temperature. For example, gelatin is gelled at a low temperature and thus is preferably subjected to a coating process at a temperature equal to or higher than the gelling temperature, and HPMC is gelled at a high temperature and thus is preferably applied at a temperature lower than the gelling temperature.

The orthodontic member may have a tube shape, a hollow polygonal prism shape, a funnel shape, a hollow truncated cone shape, or a hollow truncated polygonal pyramid shape.

Next, in the wire coated with the composition, the composition is dried, thus obtaining the wire and an orthodontic member containing the wire in the hollow portion thereof (step c).

Step (c) is preferably performed at a temperature of 25 to 30° C. and a relative humidity of 20 to 40%, but the present invention is not limited thereto. Step (c) may be carried out until the composition reaches a state of equilibrium. This process may be performed for 12 to 72 hr under the above conditions.

In step (c), the composition may be hardened into a gel that is close to a solid. When the orthodontic member is applied to orthodontic treatment, it is preferred to have strength suitable for maintaining the hollow portion, as well as flexibility to an extent that it does not break even upon bending of the orthodontic wire so as to be adapted to the state of arrangement of the teeth.

Finally, the wire is removed from the orthodontic member containing the wire therein, yielding the orthodontic member (step d).

After step d, treating the surface of the orthodontic member with oil (step d-1) may be further performed.

The oil may include mineral oil, silicone oil, vegetable oil, etc.

In order to facilitate the dental operation by an operator, the orthodontic member into which the wire is inserted may be provided.

MODE FOR INVENTION

Examples

A better understanding of the present invention may be obtained through the following examples which are set forth to illustrate, but are not to be construed to limit the scope of the present invention.

Preparation Example 1: Preparation of Coating Solution 430 parts by weight of gelatin (made by Geltech, 250 bloom) was dispersed in 390 parts by weight of water, after which 140 parts by weight of glycerin was added thereto and mixed therewith. Thereafter, 5 parts by weight of a sorbitol solution (70% concentration) dissolved in water was added and uniformly dispersed. Subsequently, gelatin was dissolved for 60 min at 90° C. and defoaming was carried out in a vacuum at 700 mmHg at 65° C. for 30 min. The defoamed solution was aged at 60° C. for 6 hr, thereby preparing a coating solution.

Preparation Example 2: Preparation of Coating Solution

A coating solution was prepared using hydroxypropyl methyl cellulose (HPMC) having a viscosity of 6 mPa·s in a 2 wt % aqueous solution. 585 parts by weight of purified water and 1 part by weight of potassium sorbate were added and mixed together, and the resulting solution was heated to 90. The solution at 90 was added with 220 parts by weight of HPMC and 194 parts by weight of ethanol and mixed for 2 hr, thus dissolving the HPMC. The prepared composition was aged at 55 for 12 hr, thereby yielding a coating composition for an orthodontic member.

Example 1: Manufacture of Water-Soluble Tube

The coating solution of Preparation Example 1 was placed in an immersion bath that was maintained at 45° C. A stainless steel linear wire having a length of 100 mm and a diameter of 0.5 mm was fixed using fixing screws, and was then coated with paraffin. The wire was immersed in the coating solution and immediately taken out of the coating solution, thus uniformly coating the wire with the coating solution. Thereafter, drying was performed at room temperature and a relative humidity of 25% for 24 hr, followed by removing the wire, thereby obtaining an orthodontic member.

Example 2: Manufacture of Water-Soluble Tube

The coating solution of Preparation Example 2 was placed in an immersion bath that was maintained at 20. A wire having a length of 100 mm and a diameter of 0.5 mm was fixed using fixing screws, and was then coated with paraffin. The wire was immersed in the coating solution and was immediately taken out of the coating solution, thus uniformly coating the wire with the coating solution. With reference to FIGS. 3 and 4, drying was performed at room temperature and a relative humidity of 25% for 24 hr, after which the coating layer was marked with a white center mark, working marks and end marks using an edible colorant, and the wire was removed, thereby obtaining an orthodontic member having white marks formed thereon.

Example 3: Manufacture of Wire-Assembled Orthodontic Member

A wire was inserted into the orthodontic member of Example 1, thus manufacturing a wire-assembled orthodontic member.

Example 4: Manufacture of Wire-Assembled Orthodontic Member

With reference to FIGS. 5 and 6, a wire having a center line marked thereon was inserted into the orthodontic member of Example 2 having the center mark, the working marks and the end marks thereon, so that the center line was aligned with the center mark, thus manufacturing a wire-assembled orthodontic member.

Test Examples

Clinical Test Example 1: Orthodontic Treatment Using Orthodontic Member

The clinical test process for orthodontic treatment using the water-soluble tube of Examples 1 and 3 is illustrated in FIG. 7, and the front and side photographs thereof are illustrated in FIG. 8.

With reference to FIGS. 7 and 8, a nickel-titanium wire was inserted into the water-soluble tube of Example 1 outside the mouth, and the wire-inserted tube was directly attached to the teeth. As a result, it was shown to be applicable even to the back teeth.

Therefore, the water-soluble tube of Example 1 had a simple structure and an aesthetic appearance, was comfortable in that soft tissue irritation was not caused by the device, and enabled oral cleanliness to be easily maintained.

Clinical Test Example 2: Orthodontic Treatment Using Orthodontic Member

The clinical test process for orthodontic treatment using the wire-assembled orthodontic member of Examples 2 and 4 having the wire inserted into the hollow portion thereof is illustrated in FIG. 9, and the front and side photographs of the teeth using the orthodontic member are illustrated in FIG. 10.

With reference to FIGS. 9 and 10, the orthodontic member of Examples 1 and 3 was directly adhered to the teeth. As a result, they were shown to be applicable even to the back teeth.

Therefore, the wire-assembled orthodontic member of Example 4 had a simple structure and an aesthetic appearance, was comfortable in that soft tissue irritation was not caused by the device, and enabled oral cleanliness to be easily maintained.

Clinical Comparative Test Example 1: Orthodontic Treatment Using Conventional Braces FIG. 2 schematically illustrates the side cross-sections of the water-soluble tube-shaped orthodontic member according to the present invention, conventional braces, and conventional small hollow tubes, and FIG. 11 illustrates the orthodontic results using the conventional braces.

With reference to FIGS. 2 and 11, the conventional braces were adhered to the teeth and then tied such that the wire was not removed from the braces using ties. As a result, the braces, having a large and complicated structure, and their ancillaries irritated the soft tissue in the mouth.

Therefore, the conventional braces had a complicated structure and a poor aesthetic appearance, irritated the soft tissue in the mouth, and made it difficult to maintain oral cleanliness.

Clinical Comparative Test Example 2: Orthodontic Treatment Using Hollow Tubes

The photographs for orthodontic treatment using conventional hollow tubes are illustrated in FIG. 12.

With reference to FIGS. 2 and 12, the conventional hollow tubes were adhered to the teeth and the wire was inserted so as to sequentially pass through the hollow tubes.

As such, since it is impossible to insert the wire from the back of the throat, these tubes were applied to partial orthodontic treatment, which was limited only to the front teeth.

Therefore, the hollow tubes may be applied to partial orthodontic treatment limited only to the front teeth, and a long period of time is required to insert the wire.

The scope of the present invention is shown by the claims which will be described later, and all variations or modifications deduced from the meanings, scope and equivalents of the claims should be construed as being included in the scope of the present invention.

INDUSTRIAL APPLICABILITY

According to the present invention, a water-soluble or biodegradable orthodontic member can be provided.

Also, the present invention can provide an orthodontic member, which facilitates the insertion of a wire and the attachment to the surface of the teeth using an adhesive and enables simple orthodontic treatment.

Also, the present invention can provide an orthodontic member, which is dissolved or biodegraded after a predetermined period of time for the orthodontic treatment, thus forming a clearance between the wire and the adhesive, whereby the teeth can easily move in a sliding manner along the wire.

Also, the present invention can provide an orthodontic member having a hollow portion, wherein a center mark is formed on the orthodontic member, and thus when a wire having a center line marked thereon is assembled with the orthodontic member by being inserted into the hollow portion thereof, the center of the orthodontic member can be easily aligned with the center line of the wire.

Also, the present invention can provide a method of manufacturing such an orthodontic member.

The invention claimed is:

1. An orthodontic member, comprising a hollow structure and a mark,
    wherein
    the hollow structure is one of a tube, a hollow polygonal prism, a hollow truncated polygonal pyramid, a hollow truncated cone, and a funnel,
    the hollow structure is made of a water-soluble or biodegradable material, and
    the mark is formed on the hollow structure and includes at least one selected from among a center mark representing a center in a longitudinal direction of the orthodontic member, a working mark representing a length from the center of the orthodontic member, and an end mark representing an end of the orthodontic member.

2. The orthodontic member of claim 1, wherein the hollow structure is a tube, wherein the tube has an inner diameter of 0.2 to 1.0 mm and a thickness of 0.001 to 0.5 mm.

3. The orthodontic member of claim 1, wherein the hollow structure is a hollow polygonal prism, wherein the hollow polygonal prism is an n-gonal prism, in which n is any one integer from 3 to 20.

4. The orthodontic member of claim 3, wherein the hollow polygonal prism has a cross-section of a hollow polygonal shape,
    a circle inscribed on the hollow polygonal shape has a diameter of 0.2 to 1.0 mm, and
    the hollow polygonal prism has a thickness of 0.001 to 0.5 mm.

5. The orthodontic member of claim 1, wherein the hollow structure is a hollow truncated polygonal pyramid, wherein the hollow truncated polygonal pyramid is an n-gonal hollow truncated pyramid, in which n is any one integer from 3 to 20.

6. The orthodontic member of claim 5, wherein the hollow truncated polygonal pyramid has a cross-section of a hollow polygonal shape, and
    a ratio (F/f, p) of a maximum diameter (F) to a minimum diameter (f) of a circle circumscribed on the hollow polygonal shape is 1<p≤10.

7. The orthodontic member of claim 1, wherein the hollow structure is a hollow truncated cone, wherein a ratio (E/e, q) of a diameter (E) of a maximum inner circumference to a diameter (e) of a minimum inner circumference in the hollow truncated cone is 1<q<10.

8. The orthodontic member of claim 1, wherein the hollow structure is a funnel, wherein the funnel is provided in a form in which a hollow truncated cone is connected to one end of a hollow cylinder.

9. The orthodontic member of claim 8, wherein in the funnel, a ratio (D/d, r) of a diameter (D) of a maximum inner circumference of the hollow truncated cone to a diameter (d) of an inner circumference of the hollow cylinder is 1<r≤10.

10. The orthodontic member of claim 1, wherein the orthodontic member is transparent or has any one color selected from the group consisting of white, red, blue, yellow, green, and mixtures thereof.

11. The orthodontic member of claim 1, wherein the center mark is represented by a predetermined color depending on a size of an inner diameter or an outer diameter of the orthodontic member.

12. The orthodontic member of claim 11, wherein the center mark has a thickness of 0.1 to 5 mm.

13. The orthodontic member of claim 11, wherein the color is any one selected from the group consisting of white, red, blue, yellow, green, and mixtures thereof.

14. The orthodontic member of claim 1, wherein the water-soluble or biodegradable material comprises at least one selected from among gelatin, starch, a starch derivative, cellulose, a cellulose derivative, plant gum, agar, algine, an alginic acid salt, carrageenan, chitosan, a chitosan derivative, pectin, dextran, hyaluronic acid, polyacrylamide, polyvinylpyrrolidone, polyvinylalcohol, polyacrylic acid, polyethylene glycol, polypropylene glycol, polyethylene oxide, polypropylene oxide, biodegradable polyamide, biodegradable polyurethane, and biodegradable polyester.

15. The orthodontic member of claim 14, wherein the water-soluble or biodegradable material further comprises, based on 100 parts by weight of the at least one selected from among gelatin, starch, a starch derivative, cellulose, a cellulose derivative, plant gum, agar, algine, an alginic acid salt, carrageenan, chitosan, a chitosan derivative, pectin, dextran, hyaluronic acid, polyacrylamide, polyvinylpyrrolidone, polyvinylalcohol, polyacrylic acid, polyethylene glycol, polypropylene glycol, polyethylene oxide, polypropylene oxide, biodegradable polyamide, biodegradable polyurethane, and biodegradable polyester, 1 to 200 parts by weight of a compound represented by Chemical Formula 1 below:

[Chemical Formula 1]

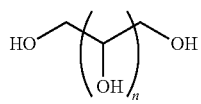

in Chemical Formula 1, n is any one integer from 1 to 8.

16. The orthodontic member of claim 1, wherein the water-soluble or biodegradable material comprises a compound represented by Chemical Formula 2 below:

[Chemical Formula 2]

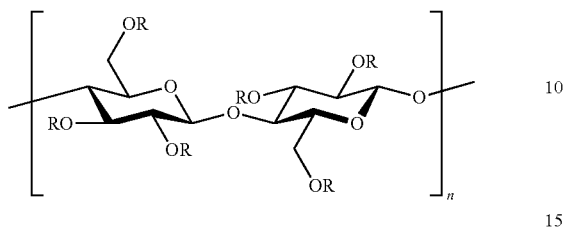

in Chemical Formula 2,
R is independently a hydrogen atom, a deuterium atom, a C1 to C6 alkyl group or a C1 to C6 hydroxyalkyl group,
n is a repeating unit, and
the compound represented by Chemical Formula 2 has a number average molecular weight ranging from 1,000 to 9,000,000.

17. The orthodontic member of claim 1, wherein the mark is formed using an edible colorant.

* * * * *